(12) United States Patent
Kagawa

(10) Patent No.: US 11,931,972 B2
(45) Date of Patent: Mar. 19, 2024

(54) HIGH-MOISTURE-PERMEABILITY, MICROPOROUS PLASTIC FILM, AND ITS PRODUCTION METHOD AND APPARATUS

(71) Applicant: Seiji Kagawa, Koshigaya (JP)

(72) Inventor: Seiji Kagawa, Koshigaya (JP)

( * ) Notice: Subject to any disclaimer, the term of this patent is extended or adjusted under 35 U.S.C. 154(b) by 665 days.

(21) Appl. No.: 17/095,974

(22) Filed: Nov. 12, 2020

(65) Prior Publication Data

US 2021/0069994 A1 Mar. 11, 2021

Related U.S. Application Data

(62) Division of application No. 15/185,966, filed on Jun. 17, 2016, now Pat. No. 10,875,259.

(30) Foreign Application Priority Data

Nov. 17, 2015 (JP) ................................ 2015-224969

(51) Int. Cl.
*B29C 69/00* (2006.01)
*B24B 19/22* (2006.01)
(Continued)

(52) U.S. Cl.
CPC .......... *B29C 69/001* (2013.01); *B24B 19/223* (2013.01); *B26D 7/265* (2013.01);
(Continued)

(58) Field of Classification Search
CPC ..... B29C 69/001; B29C 59/04; B24B 19/223; B26D 7/265; B26D 2001/002; B26F 1/22;
(Continued)

(56) References Cited

U.S. PATENT DOCUMENTS 3,670,672 A 6/1972 Spanel et al.
4,814,124 A 3/1989 Aoyama et al.
(Continued)

FOREIGN PATENT DOCUMENTS

DE 102009044113 A1 4/2011
JP 05-131557 A 6/1993
(Continued)

OTHER PUBLICATIONS

Korean Office Action for Korean Application No. 10-2016-0102674, dated Jul. 26, 2022, with English translation.
(Continued)

*Primary Examiner* — Monica A Huson
*Assistant Examiner* — Kelsey C Grace
(74) *Attorney, Agent, or Firm* — Birch, Stewart, Kolasch & Birch, LLP

(57) ABSTRACT

A high-moisture-permeability, microporous plastic film randomly having a lot of recesses having different opening diameters and depths, with clefts formed in the recesses, is produced by pressing a first pattern roll randomly having a lot of high-hardness, fine particles having sharp edges on a roll body surface to a flat-surface metal roll, to produce an anvil roll randomly having a lot of recesses on a metal roll surface; arranging a second pattern roll randomly having a lot of high-hardness, fine particles having sharp edges on a roll body surface oppositely to the anvil roll; and passing a plastic film through a gap between the second pattern roll and the anvil roll.

9 Claims, 9 Drawing Sheets

(51) Int. Cl.
* B26D 7/26* (2006.01)
* B26F 1/22* (2006.01)
* B29C 59/04* (2006.01)
* B65D 65/38* (2006.01)
* B26D 1/00* (2006.01)
* B29K 23/00* (2006.01)
* B29L 31/00* (2006.01)

(52) U.S. Cl.
CPC ................ *B26F 1/22* (2013.01); *B29C 59/04* (2013.01); *B65D 65/38* (2013.01); *B26D 2001/002* (2013.01); *B29K 2023/12* (2013.01); *B29K 2905/08* (2013.01); *B29K 2905/12* (2013.01); *B29K 2995/0068* (2013.01); *B29L 2031/7128* (2013.01)

(58) Field of Classification Search
CPC ........................... B65D 65/38; B29K 2023/12; B29K 2905/08; B29K 2905/12; B29K 2995/0068; B29L 2031/7128
See application file for complete search history.

(56) References Cited

U.S. PATENT DOCUMENTS

| | | | |
|---|---|---|---|
| 5,257,923 | A | 11/1993 | Kagawa |
| 5,352,108 | A | 10/1994 | Kagawa et al. |
| 5,415,538 | A | 5/1995 | Kagawa |
| 5,914,184 | A | 6/1999 | Morman |
| 6,599,612 | B1 | 7/2003 | Gray |
| 2003/0201582 | A1 | 10/2003 | Gray |
| 2016/0107211 | A1 | 4/2016 | Kagawa et al. |

FOREIGN PATENT DOCUMENTS

| | | | |
|---|---|---|---|
| JP | 06-61859 | B2 | 8/1994 |
| JP | 09-57880 | A | 3/1997 |
| JP | 2001-310406 | A | 11/2001 |
| JP | 2002-050467 | A | 2/2002 |
| JP | 2006-158254 | A | 6/2006 |
| JP | 2011-225234 | A | 11/2011 |
| JP | 5739575 | B1 | 6/2015 |
| KR | 1987-0006976 | A | 8/1987 |
| KR | 1992-0016223 | A | 9/1992 |

OTHER PUBLICATIONS

Extended European Search Report issued in European Application No. 16174706.8, dated May 3, 2017.
Japanese Office Action in JP 2015-224969 dated Jan. 21, 2016.
Roseville Rock Rollers, Inc., "Mohs Hardness Scale," http://web.archive.org/web/20110415092249/http://www.rockrollers.com:80/features/hardness.html, Apr. 15, 2011, one page.

1000 μm

250 μm

HIGH-MOISTURE-PERMEABILITY, MICROPOROUS PLASTIC FILM, AND ITS PRODUCTION METHOD AND APPARATUS

CROSS-REFERENCE TO RELATED APPLICATIONS

This application is a Divisional application of co-pending application Ser. No. 15/185,966, filed on Jun. 17, 2016, which claims the benefit under 35 U.S.C. § 119(a) to Patent Application No. 2015-224969, filed in Japan on Nov. 17, 2015, all of which are hereby expressly incorporated by reference into the present application.

FIELD OF THE INVENTION

The present invention relates to a food-packaging plastic film having high gas permeability and moisture permeability, particularly to a high-moisture-permeability, microporous plastic film suitable for packaging foods, from which a large amount of moisture is vaporizable, such as bread, and its production method and apparatus.

BACKGROUND OF THE INVENTION

Foods such as bread, vegetables, etc. have conventionally been packaged in bags of papers or films of plastics such as polyolefins, etc. for sale. Though paper bags have high moisture permeability, they are disadvantageous in failing to see the contents. Though contents can be seen through plastic film bags, the plastic film bags do not have sufficient moisture permeability, likely deteriorating the taste and feel of bread extremely. Particularly because French bread needing the feel of hardness has water activity of 0.95 immediately after baked, higher than a level of giving proper feel (0.9–0.85), French bread should be packaged after drying to lower the water activity to this level, to avoid losing the feel of hardness. If bread were packaged in a plastic film bag before lowering the water activity sufficiently, the bread would become rapidly soft, resulting in deteriorated feel.

To obtain plastic films having high moisture permeability, through which their contents are well seen, forming large numbers of pores having diameters of about 0.5-3 mm have been conventionally known. For example, JP 2006-158254 A discloses an orange-storing bag formed by a single-layer or multi-layer polymer film as thick as 10-200 μm, which has one or more small pores per one bag. Each fine pore has an opening area of 0.1 mm$^2$ or less (for example, average pore diameter of about 50 μm) in the number of, for example, 24/bag. JP 2006-158254 A discloses a method of mechanically forming pores by needles, a pore-forming method using heated needles, a laser, electric discharge, etc., a method of forming pores by passing a film through rolls having fine sharp projections, etc. However, fine pores in this bag have as large diameters as about 50 μm on average, with a small number per a bag. Though it suggests a pore-forming method using a roll having fine sharp projections, its specific construction is not described.

JP 2011-225234 A discloses a food-packaging laminate film comprising a permeable substrate, and a film of polyurethane and styrene-butadiene-styrene (SBS) rubber heat-adhered to at least one surface of the substrate. The film of polyurethane and SBS rubber has moisture permeability of 500-1000 g·30 μm/(m$^2$·day·40° C.90% RH). The permeable substrate is a non-woven fabric, a rayon paper, a cellophane film, a bored film, a polylactic acid film, a polystyrene film having thickness of 30 μm or less, etc. The polyurethane/SBS rubber film can be laminated with the permeable substrate by extrusion lamination. However, not only because (a) the polyurethane/SBS rubber film per se is expensive, but also because (b) an extrusion lamination step of the polyurethane/SBS rubber film with the permeable substrate is needed, this food-packaging laminate film is too expensive as a film of packaging foods such as bread, vegetables, etc.

In view of the above circumstances, it is desired to provide plastic films having sufficient moisture permeability to vaporize its moisture quickly, which can viewably package foods such as bread, vegetables, etc., and can be produced inexpensively.

OBJECT OF THE INVENTION

Accordingly, an object of the present invention is to provide a high-moisture-permeability, microporous plastic film capable of viewably packaging contents, having sufficient moisture permeability to ensure that the moisture of packaged contents can vaporize quickly, and inexpensively producible, and its production method and apparatus.

SUMMARY OF THE INVENTION

As a result of intensive research in view of the above object, the inventor has found that by pressing a first pattern roll randomly having a lot of high-hardness, fine particles having different sizes to a flat-surface metal roll, to produce an anvil roll having a lot of recesses having different sizes, and by passing a plastic film under pressure through a gap between such an anvil roll and a second pattern roll randomly having a lot of high-hardness, fine particles having different sizes, the plastic film is randomly provided with a lot of recesses having different opening diameters and depths, with clefts formed in the recesses, thereby efficiently producing a microporous plastic film having desired high moisture permeability. The present invention has been completed based on such finding.

Thus, the high-moisture-permeability, microporous plastic film of the present invention randomly has a lot of recesses having different opening diameters and depths, with clefts formed in the recesses;

the recesses having an opening diameter distribution in a range of 60-300 μm and a depth distribution in a range of 10-100 μm;

50% or more of the clefts being formed in boundary regions between the bottoms and sides of the recesses, thereby having moisture permeability of 100-7000 g/m$^2$·24 hr·40° C.90% RH.

The recesses preferably have an opening diameter distribution width of 100 μm or less and a depth distribution width of 50 μm or less.

The recesses preferably have an average opening diameter of 100-240 μm and an average depth of 20-80 μm.

The recesses preferably have substantially polygonal shapes.

The area ratio of the recesses on a surface of the plastic film is preferably 10-70%.

The plastic film preferably has a thickness in a range of 20-100 μm.

The clefts are preferably formed in at least 30% of the recesses.

The method of the present invention for producing a high-moisture-permeability, microporous plastic film randomly having a lot of recesses having different opening diameters and depths, with clefts formed in the recesses, comprises pressing a first pattern roll randomly having a lot of high-hardness, fine particles having sharp edges on a roll body surface to a flat-surface metal roll, to produce an anvil roll randomly having a lot of recesses on a surface of the metal roll;

arranging a second pattern roll randomly having a lot of high-hardness, fine particles having sharp edges on a roll body surface, oppositely to the anvil roll; and passing the plastic film through a gap between the second pattern roll and the anvil roll.

In the method of the present invention, each of the first and second pattern rolls preferably randomly has a lot of high-hardness, fine particles having sharp edges on a roll body surface; the fine particles having Mohs hardness of 5 or more, an aspect ratio of 2 or less, a diameter distribution in a range of 80-500 μm, and a height distribution in a range of 20-200 μm.

In the method of the present invention, the anvil roll is preferably a metal roll randomly having a lot of recesses having an opening diameter distribution in a range of 70-350 μm and a depth distribution in a range of 15-150 μm on the surface.

In the method of the present invention, the moisture permeability is preferably adjusted by a pressing force to the plastic film passing through a gap between the second pattern roll and the anvil roll.

In the method of the present invention, high-hardness, fine particles on the first pattern roll preferably have a diameter distribution width of 120 μm or less and a height distribution width of 50 μm or less.

In the method of the present invention, the recesses of the anvil roll preferably have an opening diameter distribution width of 100 μm or less and a depth distribution width of 50 μm or less.

In the method of the present invention, high-hardness, fine particles on the second pattern roll preferably have a diameter distribution width of 120 μm or less and a height distribution width of 50 μm or less.

In the method of the present invention, high-hardness, fine particles on the first and second pattern rolls preferably have an average diameter of 150-400 μm and an average height of 50-150 μm. Recesses formed on a surface of the anvil roll preferably have an average opening diameter of 110-300 μm and an average depth of 25-120 μm.

In the method of the present invention, the high-hardness, fine particles are preferably attached at an area ratio of 10-70% to roll surfaces of the first and second pattern rolls.

In the method of the present invention, the area ratio of the recesses on the surface of the anvil roll is preferably 10-70%.

In the method of the present invention, a force of pressing the plastic film is preferably in a range of 0.2-150 kgf/cm as linear pressure.

The apparatus of the present invention for producing a high-moisture-permeability, microporous plastic film randomly having a lot of recesses having different opening diameters and depths, with clefts formed in the recesses, comprises a pattern roll randomly having a lot of high-hardness, fine particles having sharp edges on a roll body surface;

an anvil roll arranged oppositely to the pattern roll;

a conveyor roll for passing a plastic film through a gap between the pattern roll and the anvil roll; and a means for adjusting a gap between the pattern roll and the anvil roll;

the anvil roll being randomly provided with a lot of recesses on the surface.

In the apparatus of the present invention, high-hardness, fine particles on the pattern roll preferably have Mohs hardness of 5 or more, an aspect ratio of 2 or less, a diameter distribution in a range of 80-500 μm, and a height distribution in a range of 20-200 μm. The recesses of the anvil roll preferably have an opening diameter distribution in a range of 70-350 μm and a depth distribution in a range of 15-150 μm.

In the apparatus of the present invention, high-hardness, fine particles on the pattern roll preferably have a diameter distribution width of 120 μm or less and a height distribution width of 50 μm or less.

In the apparatus of the present invention, the recesses of the anvil roll preferably have an opening diameter distribution width of 100 μm or less and a depth distribution width of 50 μm or less.

In the apparatus of the present invention, high-hardness, fine particles on the pattern roll preferably have an average diameter of 150-400 μm and an average height of 50-150 μm. The recesses formed on a surface of the anvil roll preferably have an average opening diameter of 110-300 μm and an average depth of 25-120 μm.

In the apparatus of the present invention, the high-hardness, fine particles are preferably attached at an area ratio of 10-70% to a roll surface of the pattern roll.

In the apparatus of the present invention, the area ratio of the recesses on the surface of the anvil roll is preferably 10-70%.

In the apparatus of the present invention, a force of pressing the plastic film is preferably adjusted in a range of 0.2-150 kgf/cm as linear pressure by the gap-adjusting means.

BRIEF DESCRIPTION OF THE DRAWINGS

FIG. 8($b$) is an optical photomicrograph (magnification: 100 times) showing the high-moisture-permeability, microporous OPP film of Sample 1.

DESCRIPTION OF THE PREFERRED EMBODIMENTS

The embodiments of the present invention will be explained in detail below referring to the attached drawings. Explanations of each embodiment are applicable to other embodiments unless otherwise mentioned. Explanations below are not restrictive, but various modifications may be made within the scope of the present invention.

[1] Production Method and Apparatus

Figure 1:
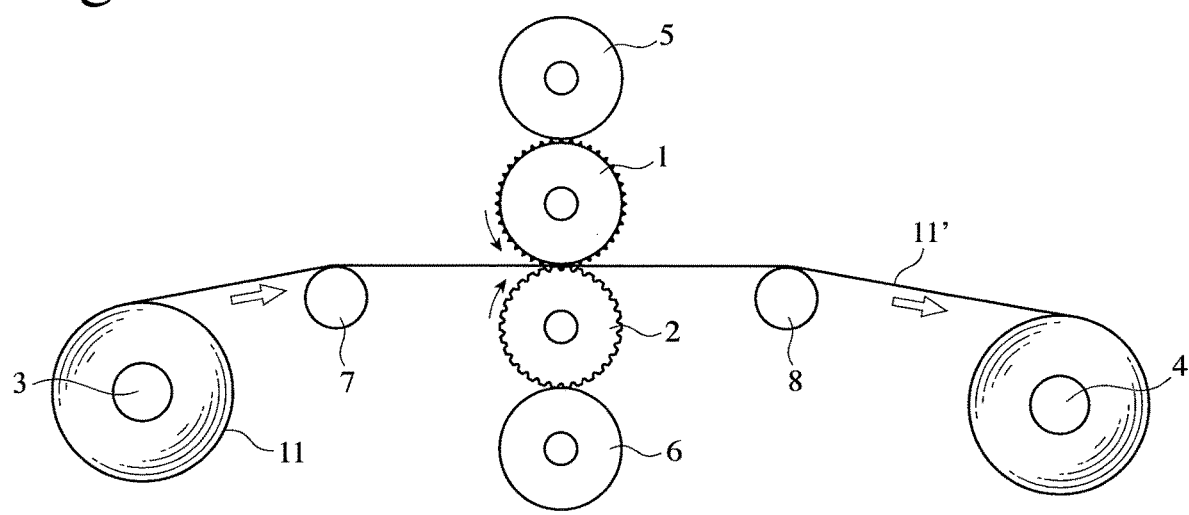
FIG. 1 is a schematic view showing the production apparatus of the present invention.

Using the apparatus shown in FIGS. 1 and 2, one example of methods for producing a high-moisture-permeability, microporous plastic film will be explained. This apparatus comprises a pattern roll 1 and an anvil roll 2 constituting a pore-forming apparatus; first and second reels 3, 4; backup rolls 5, 6 for the pattern roll 1 and the anvil roll 2; and first and second guide rolls 7, 8. The first reel 3 or the first guide roll 7 may be provided with a means (not shown) for adjusting the tension of the plastic film 11, and the second reel 4 or the second guide roll 8 may be provided with a means (not shown) for adjusting the tension of the high-moisture-permeability, microporous plastic film 11'.

(1) Pore-Forming Apparatus

Figure 2:
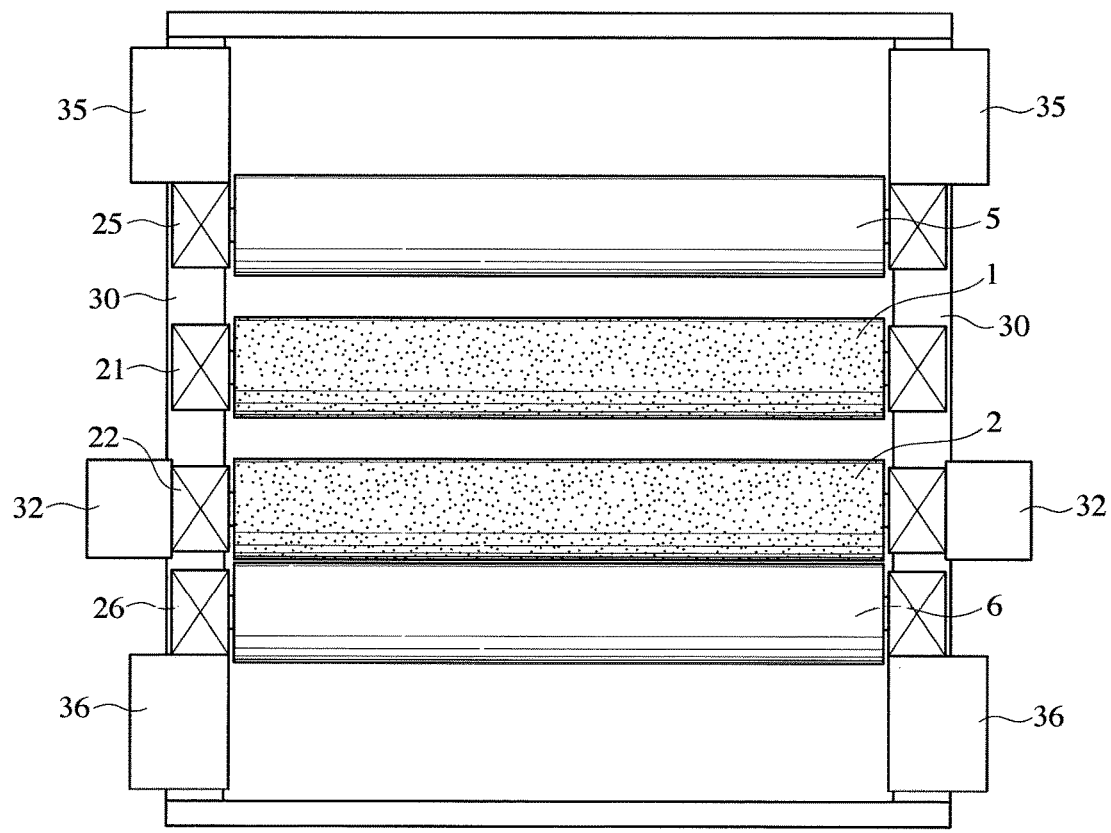
FIG. 2 is a front view showing a pore-forming apparatus in the apparatus of FIG. 1.

In the pore-forming apparatus shown in FIG. 2, the backup roll 5, the pattern roll 1, the anvil roll 2 and the backup roll 6 are rotatably supported by a pair of frames 30, 30 via pairs of bearings 25, 25, 21, 21, 22, 22, 26, 26 in this order from above. The backup rolls 5, 6 may be made of a metal or rubber. In the depicted example, both pattern roll 1 and anvil roll 2 are driving rolls. The bearings 21, 21 for the pattern roll 1 are mounted to the frames 30, 30, and the bearings 25, 25, 26, 26 for the upper and lower backup rolls 5, 6 and the bearings 22, 22 for the anvil roll 2 are vertically movable along a pair of frames 30, 30. Both bearings 25, 25 for the upper backup roll 5 are provided with driving means 35, 35, and both bearings 26, 26 for the lower backup roll 6 are provided with driving means 36, 36. The upper backup roll 5 pushes the pattern roll 1 downward, and the lower backup roll 6 pushes the anvil roll 2 upward. The anvil roll 2 pushed by the backup roll 6 is pressed to the pattern roll 1 via the plastic film 11. Pushed by the backup rolls 5, 6, the pattern roll 1 and the anvil roll 2 are prevented from elastic deformation during the formation of pores.

(2) Pattern Roll

Figure 4:
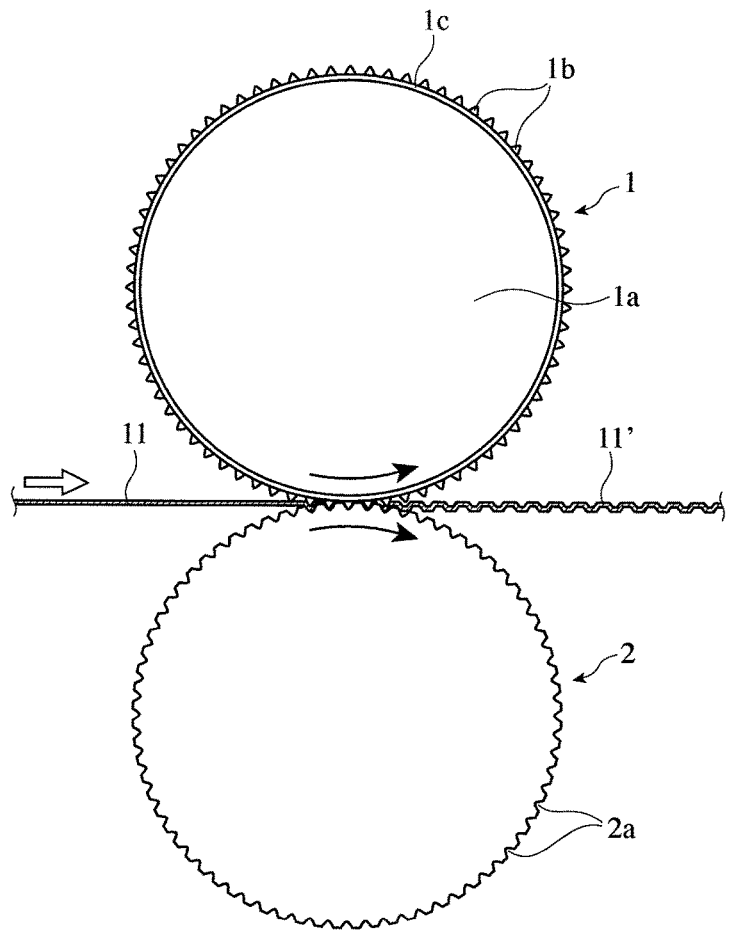
FIG. 4 is an enlarged view showing the formation of pores in a plastic film passing through a gap between a pattern roll and an anvil roll.

As shown in FIG. 4 in detail, the pattern roll 1 preferably has a lot of high-hardness, fine particles 1b randomly fixed to a surface of a metal roll body 1a by a plating layer 1c such as a nickel plating layer, etc. Specific examples of such pattern roll 1 are described, for example, in JP 5-131557 A, JP 9-57860 A and JP 2002-59487 A.

The high-hardness, fine particles 1b have sharp edges, with Mohs hardness of 5 or more and an aspect ratio of 2 or less. The high-hardness, fine particles 1b having sharp edges are preferably fine diamond particles, particularly pulverized fine diamond particles. With the aspect ratio of 2 or less, the high-hardness, fine particles 1b have polygonal shapes close to spheres. The aspect ratio of the high-hardness, fine particles 1b is preferably 1.6 or less, more preferably 1.4 or less.

The high-hardness, fine particles 1b have a diameter distribution in a range of 80-500 µm. When the high-hardness, fine particles 1b are as small as less than 80 µm, recesses 11a formed in the plastic film 11 have insufficient opening diameters, failing to have sufficient clefts. On the other hand, when the high-hardness, fine particles 1b are as large as more than 500 µm, recesses 11a formed in the plastic film 11 have too large opening diameters, so that excessive clefts are formed. The lower limit of the size of the high-hardness, fine particles 1b is preferably 100 µm, more preferably 120 µm, and the upper limit of the size of the high-hardness, fine particles 1b is preferably 450 µm, more preferably 400 µm.

Because about ½-⅔ of the high-hardness, fine particles 1b are embedded in the plating layer 1c, high-hardness, fine particles 1b projecting from a surface of the plating layer 1c have a height distribution of 20-200 µm. When the high-hardness, fine particles 1b are lower than 20 µm, sufficiently deep recesses 11a are not formed in the plastic film 11, failing to form sufficient clefts. On the other hand, when the high-hardness, fine particles 1b are higher than 200 µm, too deep recesses 11a are formed in the plastic film 11, resulting in excessive clefts. The lower limit of the height distribution of the high-hardness, fine particles 1b is preferably 30 µm, more preferably 40 µm. The upper limit of the height distribution of the high-hardness, fine particles 1b is preferably 170 µm, more preferably 150 µm.

The high-hardness, fine particles 1b preferably have an average diameter of 150-400 µm and an average height of 50-150 µm. The lower limit of the average diameter of the high-hardness, fine particles 1b is more preferably 180 µm, most preferably 200 µm. The upper limit of the average diameter of the high-hardness, fine particles 1b is more preferably 370 µm, most preferably 330 µm. The lower limit of the average height of the high-hardness, fine particles 1b is more preferably 60 µm, most preferably 70 µm. The upper limit of the average height of the high-hardness, fine particles 1b is more preferably 130 µm, most preferably 110 µm.

As described later, the high-hardness, fine particles 1b on the pattern roll 1 should have as close sizes and shapes to those of recesses 2a as possible, because the high-hardness, fine particles 1b are fit into the recesses 2a of the anvil roll 2 to form recesses 11a in the plastic film 11. To this end, the high-hardness, fine particles 1b preferably have as small a diameter distribution width as possible. The term "diameter distribution width" used herein means the difference between the maximum diameter and the minimum diameter. Of course, the opening diameter distribution width (difference between the maximum opening diameter and the minimum opening diameter) of the recesses 2a is preferably as narrow as possible. As long as the diameter distribution of the high-hardness, fine particles 1b and the opening diameter distribution of the recesses 2a are narrow, sufficient fitting can be highly likely achieved, even if they are arbitrarily combined. As a result, recesses 11a having sufficient sizes are not only formed in the plastic film 11, but many of the recesses 11a are provided with clefts 11b.

For the above reasons, the diameter distribution width of the high-hardness, fine particles 1b is preferably 120 μm or less, more preferably 100 μm or less. Having a diameter distribution of 80-500 μm with width of 120 μm or less means that for example, when the sizes of the high-hardness, fine particles 1b have an upper limit of 500 μm, their lower limit is 380 μm or more, and that when the upper limit of the sizes is 400 μm, the lower limit is 280 μm or more. Accordingly, within the diameter distribution range of 80-500 μm, high-hardness, fine particles 1b having a larger size range (width of 120 μm or less) are used when relatively large recesses 11a are to be formed in the plastic film 11, while high-hardness, fine particles 1b having a smaller size range (width of 120 μm or less) are used when relatively large recesses 11a are to be formed. Likewise, the height distribution width (difference between the maximum height and the minimum height) of the high-hardness, fine particles 1b is preferably 50 μm or less, more preferably 40 μm or less.

Because the high-hardness, fine particles (for example, fine diamond particles) 1b have various shapes and sizes, they are preferably classified to have uniform shapes and sizes.

The area ratio of high-hardness, fine particles 1b on the pattern roll 1 (percentage of high-hardness, fine particles 1b occupying the pattern roll surface) is preferably 10-70%. When the area ratio of high-hardness, fine particles 1b is less than 10%, recesses cannot be formed in the plastic film 11 with enough density, failing to obtain sufficient moisture permeability. On the other hand, it is practically difficult to attach high-hardness, fine particles 1b to the pattern roll 1 at an area ratio of more than 70%. The lower limit of the area ratio of the high-hardness, fine particles 1b is more preferably 20%, and the upper limit is more preferably 60%.

To prevent the pattern roll 1 from being bent during forming pores in the plastic film 11, a roll body 1a of the pattern roll 1 is preferably made of a hard metal. The hard metal may be die steel such as SKD11.

(3) Anvil Roll

The anvil roll 2 arranged oppositely to the pattern roll 1 has recesses 2a on a roll surface. The recesses 2a of the anvil roll 2 have an opening diameter distribution in a range of 70-350 μm and a depth distribution in a range of 15-150 μm. When the recesses 2a have opening diameters of less than 70 μm or depths of less than 15 μm, too small recesses 11a are formed in the plastic film 11, failing to have sufficient clefts. On the other hand, when the recesses 2a have opening diameters of more than 350 μm or depths of more than 150 μm, too large recesses 11a are formed in the plastic film 11, resulting in excessive clefts. The lower limit of the opening diameters of recesses 2a is preferably 80 μm, more preferably 90 μm. The upper limit of the opening diameters of recesses 2a is preferably 300 μm, more preferably 250 μm. The lower limit of the depths of recesses 2a is preferably 20 μm, more preferably 30 μm. The upper limit of the depths of recesses 2a is preferably 120 μm, more preferably 100 μm.

The recesses 2a of the anvil roll 2 have an average opening diameter of 110-300 μm and an average depth of 25-120 μm. When the recesses 2a have an average opening diameter of less than 110 μm or an average depth of less than 25 μm, too small recesses 11a are formed in the plastic film 11, failing to have sufficient clefts. On the other hand, when the recesses 2a have an average opening diameter of more than 300 μm or an average depth of more than 120 μm, too large recesses 11a are formed in the plastic film 11, resulting in excessive clefts. The lower limit of the average opening diameter of recesses 2a is preferably 120 μm, more preferably 140 μm. The upper limit of the average opening diameter of recesses 2a is preferably 280 μm, more preferably 230 μm. The lower limit of the average depth of recesses 2a is preferably 35 μm, more preferably 40 μm. The upper limit of the average depth of recesses 2a is preferably 100 μm, more preferably 80 μm.

The recesses 2a of the anvil roll 2 also preferably have uniform shapes and sizes. Accordingly, the recesses 2a preferably have an opening diameter distribution width of 100 μm or less, and a depth distribution width (difference between the maximum depth and the minimum depth) of 50 μm or less. Having an opening diameter distribution of 70-350 μm with its width of 100 μm or less means that for example, when the opening diameters of recesses 2a have an upper limit of 350 μm, their lower limit is 250 μm or more, and that when the opening diameters of recesses 2a have an upper limit of 250 μm, their lower limit is 150 μm or more. Accordingly, within the opening diameter distribution range of 70-350 μm, recesses 2a having a larger opening diameter range (width of 100 μm or less) are used when relatively large recesses 11a are to be formed in the plastic film 11, while recesses 2a having a smaller opening diameter range (100 μm or less of width) are used when relatively large recesses 11a are to be formed. The opening diameter distribution width of recesses 2a is more preferably 80 μm or less. Likewise, the opening diameter distribution width of recesses 2a is preferably 50 μm or less, more preferably 40 μm or less.

The area ratio of recesses 2a on a surface of the anvil roll 2 (percentage of recesses 2a occupying the anvil roll surface) is preferably 10-70%. When the area ratio of recesses 2a is less than 10%, recesses cannot be formed in the plastic film 11 with enough density, failing to obtain sufficient moisture permeability. On the other hand, it is practically difficult to form recesses 2a on the anvil roll 2 at an area ratio of more than 70%. The lower limit of the area ratio of recesses 2a is more preferably 20%, and the upper limit is more preferably 60%.

A metal roll for the anvil roll 2, on which recesses 2a receiving the high-hardness, fine particles 1b of the pattern roll 1 are formed, should have sufficient corrosion resistance. Of course, to prevent bending during forming pores in the plastic film 11, the anvil roll 2 should have sufficient mechanical strength. Accordingly, the anvil roll 2 is preferably made of high-strength, corrosion-resistant stainless steel (SUS440C, SUS304, etc.). The anvil roll 2 may have a two-layer structure comprising an inner layer of a hard metal such as die steel, and an outer layer of high-strength, corrosion-resistant stainless steel such as SUS304. The outer layer may be practically as thick as about 20-60 mm.

The size of each high-hardness fine particle 1b on the pattern roll 1 is expressed by a diameter of a circle having the same area as that of the fine particle 1b (equivalent circle diameter), and the opening diameter of each recess 2a on the anvil roll 2 is expressed by a diameter of a circle having the same area as that of the recess 2a (equivalent circle diameter). Likewise, the opening diameter of each recess 11a in the high-moisture-permeability, microporous plastic film 11 is expressed by an equivalent circle diameter.

[2] Production Method (1) Production of Anvil Roll

Figure 3:
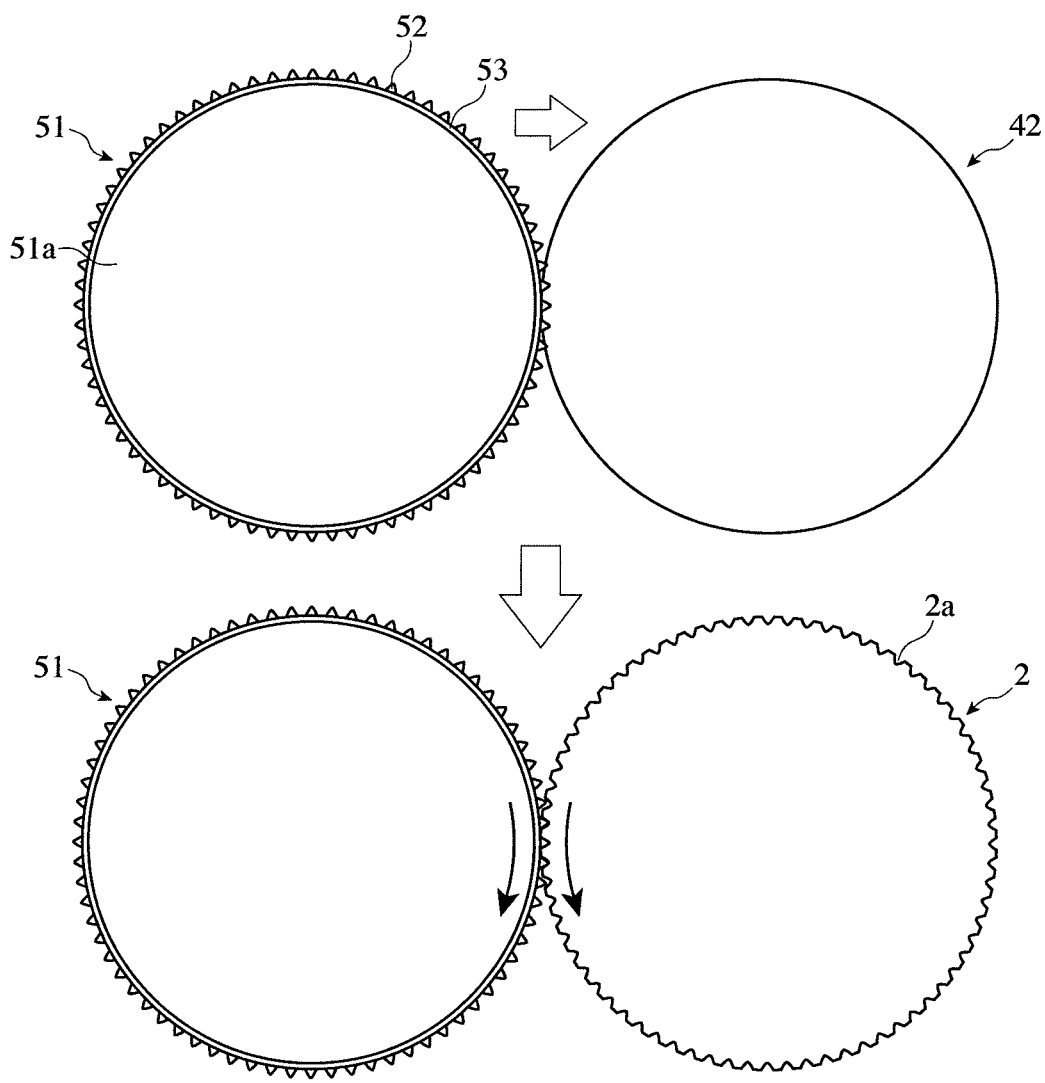
FIG. 3 is a schematic view showing the formation of recesses on a flat-surface metal roll by a first pattern roll.

As shown in FIG. 3, the anvil roll 2 randomly having a lot of recesses 2a having an opening diameter distribution in a range of 70-350 μm and a depth distribution in a range of 15-150 μm on the surface is produced by pressing a first pattern roll 51 to a flat-surface metal roll 42, the first pattern roll 51 randomly having a lot of high-hardness, fine particles 52 fixed to a surface of the roll body 51a by a plating layer 53. Like the pattern roll (second pattern roll) 1, the high-hardness, fine particles 52 on the first pattern roll 51 have sharp edges, with Mohs hardness of 5 or more, an aspect ratio of 2 or less, a diameter distribution in a range of 80-500 μm, and a height distribution in a range of 20-200 μm (from the surface of the plating layer 53).

The high-hardness, fine particles 52 on the first pattern roll 51 preferably have an average diameter of 150-400 μm and an average height of 50-150 μm. The lower limit of the average diameter of the high-hardness, fine particles 52 is more preferably 180 μm, most preferably 200 μm. The upper limit of the average diameter of the high-hardness, fine particles 52 is more preferably 370 μm, most preferably 330 μm. The lower limit of the average height of the high-hardness, fine particles 52 is more preferably 60 μm, most preferably 70 μm.

The aspect ratio of the high-hardness, fine particles 52 is more preferably 1.6 or less, most preferably 1.4 or less. The area ratio of the high-hardness, fine particles 52 is preferably 10-70%, its lower limit being more preferably 20%, and its upper limit being more preferably 60%.

Because a distribution of high-hardness, fine particles on the first pattern roll 51 may be the same as on the second pattern roll 1 as described above, one pattern roll may be used as the first or second pattern roll 51, 1.

Because the high-hardness, fine particles (for example, fine diamond particles) 52 are sufficiently harder than the metal roll 42, pressing the first pattern roll 51 to the metal roll 42 forms recesses 2a corresponding to the high-hardness, fine particles 52 on a surface of the metal roll 42. Burrs formed around recesses 2a on the metal roll 42 are removed by grinding, etc.

As a force of pressing the first pattern roll 51 to the metal roll 42 becomes larger, the recesses 2a and their area ratio become larger. A pressing force necessary for forming a lot of recesses 2a, which have an opening diameter distribution in a range of 70-350 μm and a depth distribution in a range of 15-150 μm, on the surface of the metal roll 42 by the high-hardness, fine particles 52 of the first pattern roll 51 is preferably in a range of 0.2-150 kgf/cm as linear pressure.

(2) Sizes of High-Hardness, Fine Particles of Pattern Roll and Recesses of Anvil Roll To provide the plastic film 11 with a lot of recesses having clefts, the recesses 2a of the anvil roll 2 should have such sizes as to receive the high-hardness, fine particles 1b of the pattern roll 1 with small clearance. To this end, (a) the high-hardness, fine particles 1b of the pattern roll 1 preferably have a diameter distribution in a range of 80-500 μm and a height distribution in a range of 20-200 μm; (b) the recesses 2a of the anvil roll 2 preferably have an opening diameter distribution in a range of 70-350 μm and a depth distribution in a range of 15-150 μm; (c) the high-hardness, fine particles preferably have a diameter distribution width of 120 μm or less and a height distribution width (difference between the maximum height and the minimum height) of 50 μm or less; (d) the recesses 2a preferably have an opening diameter distribution width of 100 μm or less and a depth distribution width of 50 μm or less; (e) the high-hardness, fine particles 1b preferably have an average diameter of 150-400 μm and an average height of 50-150 μm; and (f) the recesses 2a preferably have an average opening diameter of 110-300 μm and an average depth of 25-120 μm.

Further, because the recesses 2a preferably receive the high-hardness, fine particles 1b with small clearance, the difference between the average opening diameter of the recesses 2a and the average diameter of the high-hardness, fine particles 1b is preferably 100 μm or less, more preferably 50 μm or less. Also, the difference between the average depth of the recesses 2a and the average height of the high-hardness, fine particles 1b is preferably 50 μm or less, more preferably 30 μm or less. With the same first and second pattern rolls, the difference between the average opening diameter of the recesses 2a and the average diameter of the high-hardness, fine particles 1b can be made as small as possible. With the same first and second pattern rolls, the aspect ratios of the recesses 2a and the aspect ratios of the high-hardness, fine particles 1b can be made substantially the same.

(3) Plastic Film

The plastic film 11 is preferably made of a material, which is plastically deformed and provided with proper clefts, when the plastic film 11 is pressed into the recesses 2a of the anvil roll 2 by the high-hardness, fine particles 1b of the pattern roll 1. Such plastics are preferably flexible thermoplastic polymers, which include polyesters such as polyethylene terephthalate (PET), polybutylene terephthalate (PBT), etc.; polyolefins such as oriented polypropylene (OPP), cast polypropylene (CPP), polyethylene, etc.; ethylene-vinyl acetate copolymers (EVAc); polyamides such as nylons (Ny), etc.; polyvinyl chlorides, polyvinylidene chlorides, polystyrenes, etc.

As a high-moisture-permeability film for packaging foods such as bread, vegetables, etc., the plastic film 11 is preferably as thick as 20-100 μm. When the plastic film 11 is thinner than 20 μm, it does not have enough strength as a packaging film. On the other hand, the plastic film 11 is thicker than 100 μm, it is too hard as a packaging film, and difficult to be provided with pores by the method of the present invention. The thickness of the plastic film 11 is more preferably 30-80 μm.

The plastic film 11 may be a single-layer film or a laminate film. Particularly when heat sealing is conducted, it preferably has a sealant layer of a low-melting-point resin such as LLDPE and EVAc as an inner layer. The sealant layer may be as thick as about 20-60 μm.

(4) Forming Pores in Plastic Film

Figure 5:
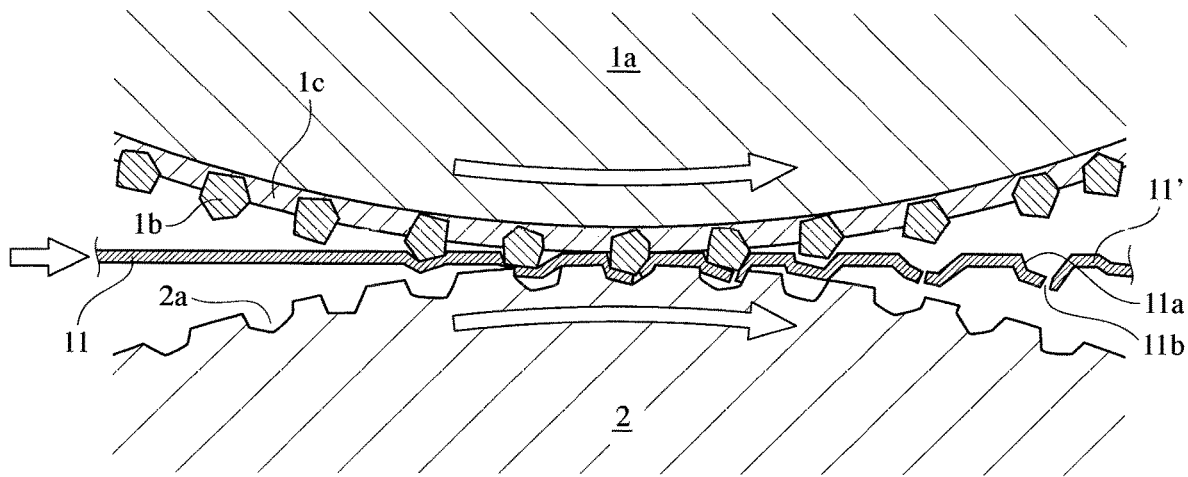
FIG. 5 is a partial enlarged cross-sectional view showing in detail the formation of pores in a plastic film passing through a gap between a pattern roll and an anvil roll.
Figure 6:
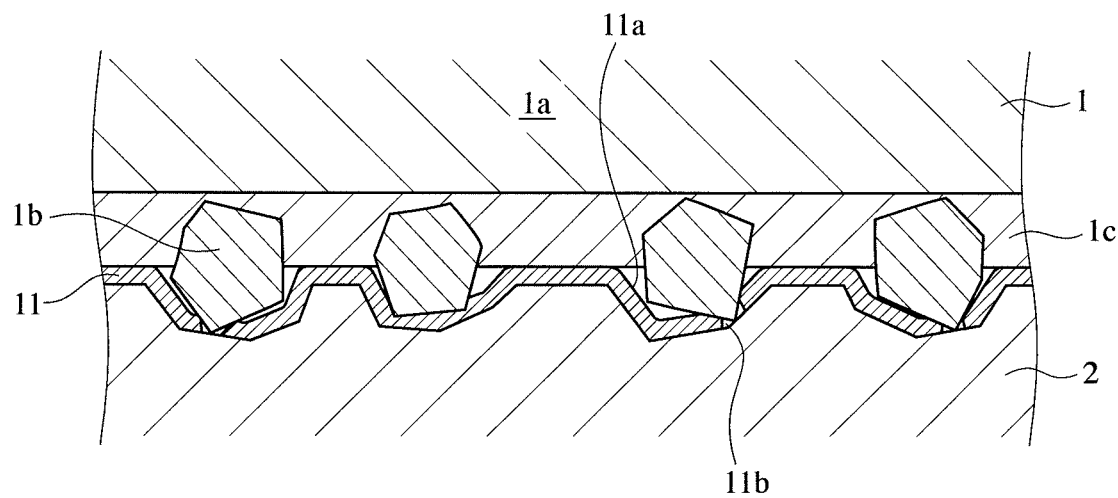
FIG. 6 is a partial enlarged cross-sectional view showing in further detail the formation of pores in a plastic film passing through a gap between a pattern roll and an anvil roll.

While a plastic film 11 is passing through a gap between a pattern roll 1 and an anvil roll 2 mounted to the pore-forming apparatus shown in FIG. 2, the driving means 32, 32 for the anvil roll 2 are operated to reduce the gap between the pattern roll 1 and the anvil roll 2a to a predetermined distance, and the driving means 35, 35, 36, 36 for the backup rolls 5, 6 are operated to adjust a pressing force applied to the pattern roll 1 and the anvil roll 2. When the plastic film 11 passes through a desired gap between the pattern roll 1 and the anvil roll 2, as shown in FIGS. 4-6, the plastic film 11 pressed by high-hardness, fine particles 1b is plastically deformed to enter the recesses 2a of the anvil roll 2. Thus, the plastic film 11 is partially expanded in narrow gaps between the high-hardness, fine particles 1b and the recesses 2a, so that the plastic film 11 is partially ruptured. Also, the plastic film 11 is cut in regions where the high-hardness, fine particles 1b come into contact with the recesses 2a of the anvil roll 2. As a result, portions of the plastic film 11 pressed by the high-hardness, fine particles 1b of the pattern roll 1 and entered the recesses 2a of the anvil roll 2 are deformed according to the shapes of the recesses 11a, so that cut portions (clefts) 11b are formed in the recesses 11a. The clefts 11b are formed mainly around peripheries of bottom surfaces of the recesses 11a (in boundary regions between side surfaces and bottom surfaces), though not restrictive of course. The clefts 11b may be formed in other portions depending on a combination of the shapes of high-hardness, fine particles 1b and the shapes of recesses 2a.

The number and sizes of recesses 11a (clefts 11b) formed in the plastic film 11 increase as a force of pressing the pattern roll 1 and the anvil roll 2 to the plastic film 11 increases. The pressing force to the plastic film 11 is preferably 0.2-150 kgf/cm as linear pressure. When the linear pressure is less than 0.2 kgf/cm, sufficient number and sizes of recesses 11a (clefts 11b) are not formed, failing to obtain desired moisture permeability. On the other hand, when the pressing force to the pattern roll 1 is more than 150 kgf/cm, the recesses 11a (clefts 11b) are likely too large. The pressing force is more preferably 1-100 kgf/cm.

[3] High-Moisture-Permeability, Microporous Plastic Film

Figure 7:
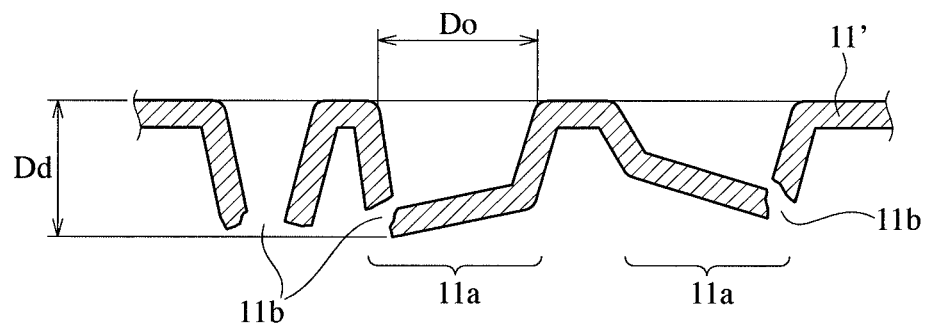
FIG. 7 is a partial enlarged cross-sectional view showing the high-moisture-permeability, microporous plastic film of the present invention.

As shown in FIG. 7, the high-moisture-permeability, microporous plastic film 11' obtained by the method of the present invention is randomly provided with a lot of recesses 11a having different opening diameters Do and depths Dd, with clefts 11b formed in the recesses 11a. The recesses 11a have an opening diameter distribution in a range of 60-300 µm and a depth distribution in a range of 10-100 µm. When the recesses 11a have opening diameters of less than 60 µm or depths of less than 10 µm, clefts 11b in sufficient number and size are not formed. On the other hand, when the recesses 11a have opening diameters of more than 300 µm or depths of more than 100 µm, the recesses 11a are too large, resulting in too large clefts 11b formed in the recesses 11a. The lower limit of the opening diameters Dod of the recesses 11a is preferably 70 µm, more preferably 80 µm. The upper limit of the opening diameters Dod of the recesses 11a is preferably 250 µm, more preferably 200 µm. The lower limit of the depths Dd of the recesses 11a is preferably 20 µm, more preferably 30 µm. The upper limit of the depths Dd of the recesses 11a is preferably 80 µm, more preferably 70 µm.

For the same reasons as described above, the high-moisture-permeability, microporous plastic film 11' further preferably has an average opening diameter Doav of 100-240 µm and an average depth Dav of 20-80 µm. The lower limit of the average opening diameter Doav of the recesses 11a is more preferably 110 µm, most preferably 120 µm. The upper limit of the average opening diameter Doav of the recesses 11a is more preferably 200 µm, most preferably 180 µm. The lower limit of the average depth Dav of the recesses 11a is more preferably 30 µm, most preferably 35 µm. The upper limit of the average depth Dav of the recesses 11a is more preferably 70 µm, most preferably 60 µm.

The recesses 11a having the above-described opening diameter distribution, average opening diameter, depth distribution and average depth have relatively uniform sizes. This is due to the fact that the high-moisture-permeability, microporous plastic film of the present invention 11' is formed by the pattern roll 1 having high-hardness, fine particles with a narrow diameter distribution and the anvil roll 2 having recesses with a narrow opening diameter distribution.

At least 30% of the recesses 11a are preferably provided with clefts 11b. When a percentage of recesses 11a provided with clefts 11b to all recesses 11a is less than 30%, the number of clefts 11b relative to the recesses 11a is too small, failing to obtain desired moisture permeability. The clefts 11b are formed in preferably at least 40%, more preferably at least 50%, of the recesses 11a.

Most (50% or more) of clefts 11b are formed in boundary regions between bottoms and sides of the recesses 11a, presumably because the plastic film 11 stretched by high-hardness, fine particles 1b is ruptured mainly in boundary regions between bottoms and sides of the recesses 11a. Of course, the plastic film 11 is ruptured at positions varying depending on a combination of the shapes and sizes of the high-hardness, fine particles 1b of the pattern roll 1 and the recesses 2a of the anvil roll 2, so that clefts 11b are also likely formed in other regions in addition to the boundary regions between bottoms and sides of the recesses 11a.

The sizes of clefts 11b are also varying depending on a combination of the shapes and sizes of high-hardness, fine particles 1b and recesses 2a. Further, a higher pressing force of the pattern roll 1 to the anvil roll 2 provides larger recesses 11a in a larger number, accompanied by larger clefts 11b in a larger number. Accordingly, the sizes and number of clefts 11b can be adjusted by the pressing force of the pattern roll 1 to the anvil roll 2.

The high-moisture-permeability, microporous plastic film of the present invention has moisture permeability of 100-7000 g/m$^2$·24 hr·40° C.90% RH. The moisture permeability is measured by "Testing Methods for Determination of Water Vapor Transmission Rate of Moisture-Proof Packaging Materials" of JIS Z 0208. With the pressing force of the pattern roll 1 to the anvil roll 2 adjusted, the sizes and number of clefts 11b can be controlled, thereby properly setting the moisture permeability of the high-moisture-permeability, microporous plastic film in a range of 100-7000 g/m$^2$·24 hr·40° C.90% RH. When the moisture permeability is less than 100 g/m$^2$·24 hr·40° C.90% RH, the high-moisture-permeability, microporous plastic film does not have moisture permeability necessary for foods such as bread, vegetables, etc. On the other hand, when the moisture permeability is more than 7000 g/m$^2$·24 hr·40° C.90% RH, the moisture permeability is too high. The moisture permeability of the high-moisture-permeability, microporous plastic film is preferably 200-6000 g/m$^2$·24 hr·40° C.90% RH, more preferably 300-6000 g/m$^2$·24 hr·40° C.90% RH. The moisture permeability of the high-moisture-permeability, microporous plastic film can be properly set within the above range depending on the contents to be packaged.

The present invention will be explained in more detail with Examples below without intention of restricting the present invention thereto.

Example 1

(1) Production of Anvil Roll

A first pattern roll 51 obtained by attaching fine polygonal diamond particles 53 having sharp edges to an SKD11 roll body having an outer diameter of 200 mm at an area ratio of about 60% with a nickel plating 52, and a flat-surface metal roll 42 having an outer diameter of 200 mm were mounted to the pore-forming apparatus shown in FIG. 2. The fine diamond particles 53 had an average aspect ratio of 1.3, a diameter distribution in a range of 250-350 µm, an average diameter of 300 µm, a height distribution of 100-140 µm, and an average height of 100 µm. The metal roll 42 had a clad structure comprising an SKD11 roll body, and an outer layer of corrosion-resistant stainless steel (SUS440C) as thick as 50 mm.

As shown in FIG. 3, the metal roll 42 was pressed by the first pattern roll 51 at linear pressure of 100 kgf/cm, to produce an anvil roll 2 having recesses 2a on a surface of the metal roll 42 at an area ratio of about 60%, the recesses 2a having an average aspect ratio of 1.3, an opening diameter distribution in a range of 150-250 µm, an average opening diameter of 180 µm, a depth distribution in a range of 30-100 µm, and an average depth of 60 µm.

(2) Forming Pores in Plastic Film

A second pattern roll 1, which was the same as the first pattern roll 51, and the above anvil roll 2 were mounted to the pore-forming apparatus shown in FIG. 2. As shown in FIG. 1, an oriented polypropylene (OPP) film 11 as thick as 40 μm was caused to pass through a gap between both rolls at linear pressure of 6 kgf/cm, 10 kgf/cm and 100 kgf/cm, respectively, to produce the high-moisture-permeability, microporous OPP films 11' of Samples 1-3.

Figure 8A:
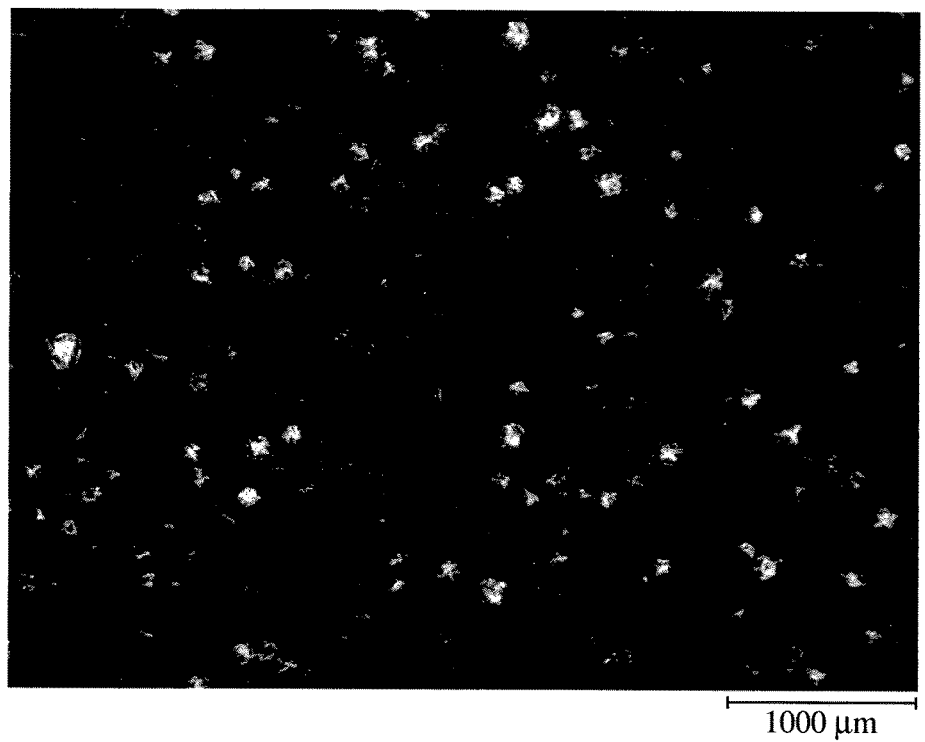
FIG. 8($a$) is an optical photomicrograph (magnification: 25 times) showing the high-moisture-permeability, microporous OPP film of Sample 1.
Figure 8B:
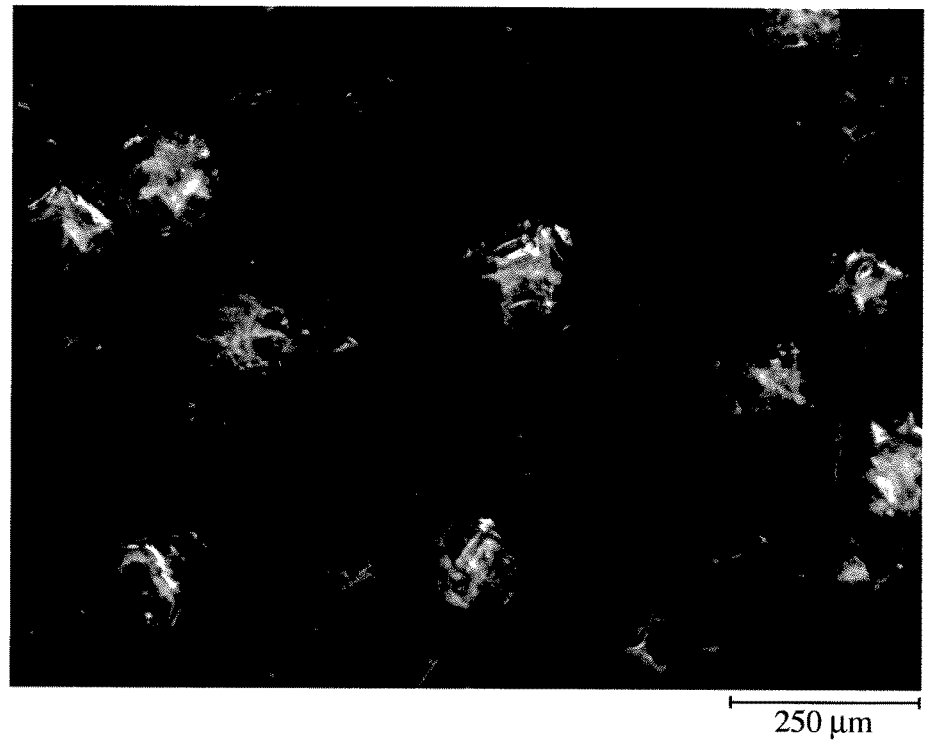
Figure 9A:
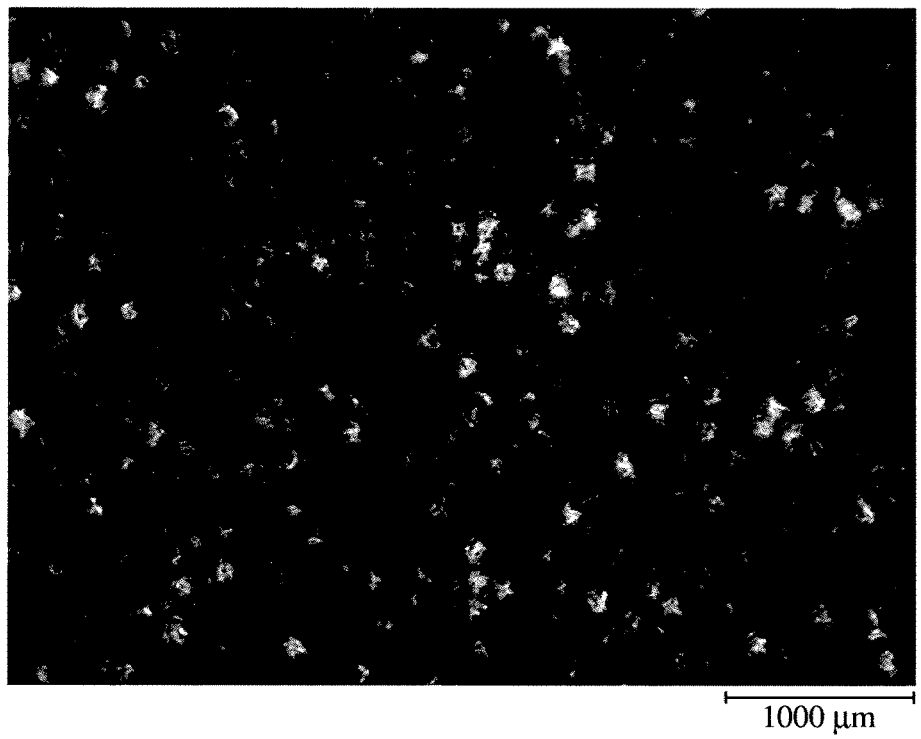
FIG. 9($a$) is an optical photomicrograph (magnification: 25 times) showing the high-moisture-permeability, microporous OPP film of Sample 2.
FIG. 9(b) is an optical photomicrograph (magnification: 100 times) showing the high-moisture-permeability, microporous OPP film of Sample 2.
Figure 9B:
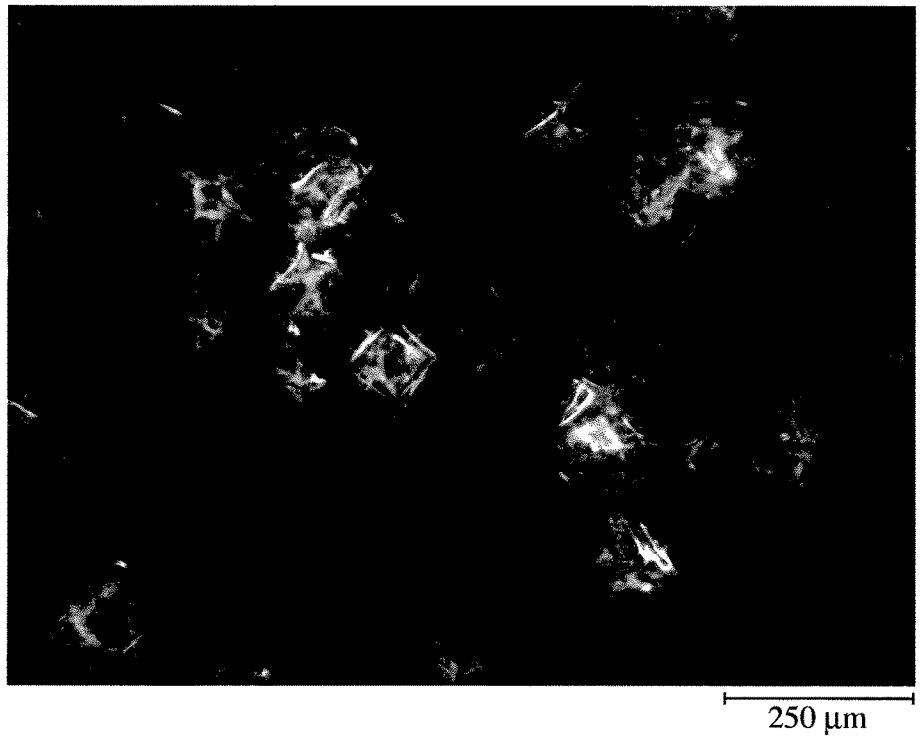
Figure 10A:
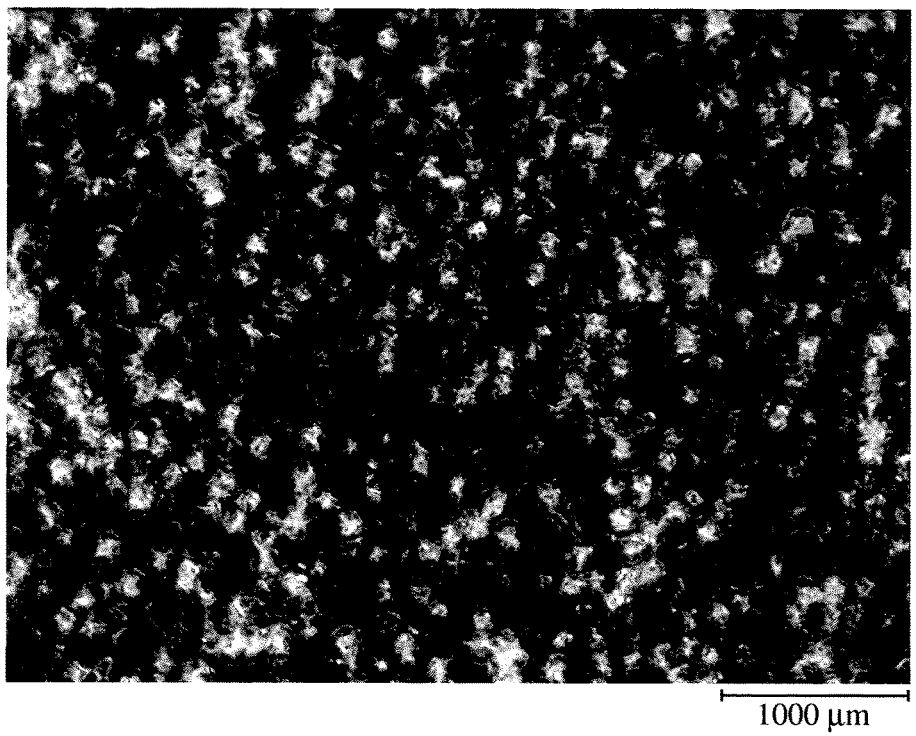
FIG. 10(a) is an optical photomicrograph (magnification: 25 times) showing the high-moisture-permeability, microporous OPP film of Sample 3.
Figure 10B:
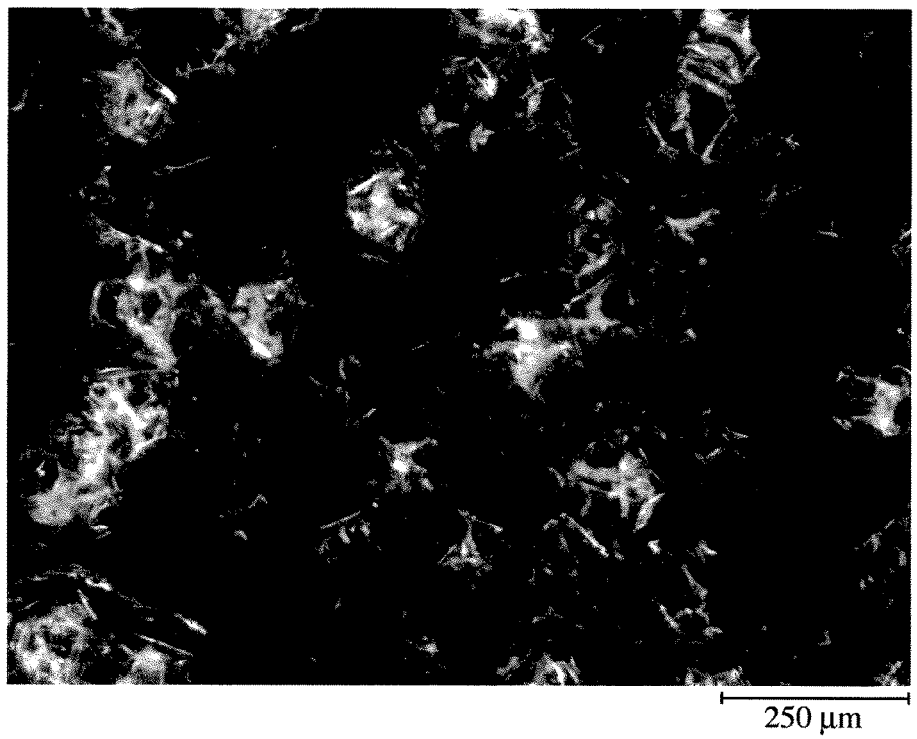
FIG. 10(b) is an optical photomicrograph (magnification: 100 times) showing the high-moisture-permeability, microporous OPP film of Sample 3.

The optical photomicrographs (magnification: 50 times) of the high-moisture-permeability, microporous OPP films 11' of Samples 1-3 are shown in FIGS. 8-10. As is clear from FIGS. 8-10, higher linear pressure provided larger recesses 11a in increased numbers. The opening diameter distributions, average opening diameters, depth distributions, average depths, and area ratios of recesses 11a in Samples 1-3, which were measured from FIGS. 8-10, are shown in Table 1.

(3) Observation of Clefts

Figure 11:
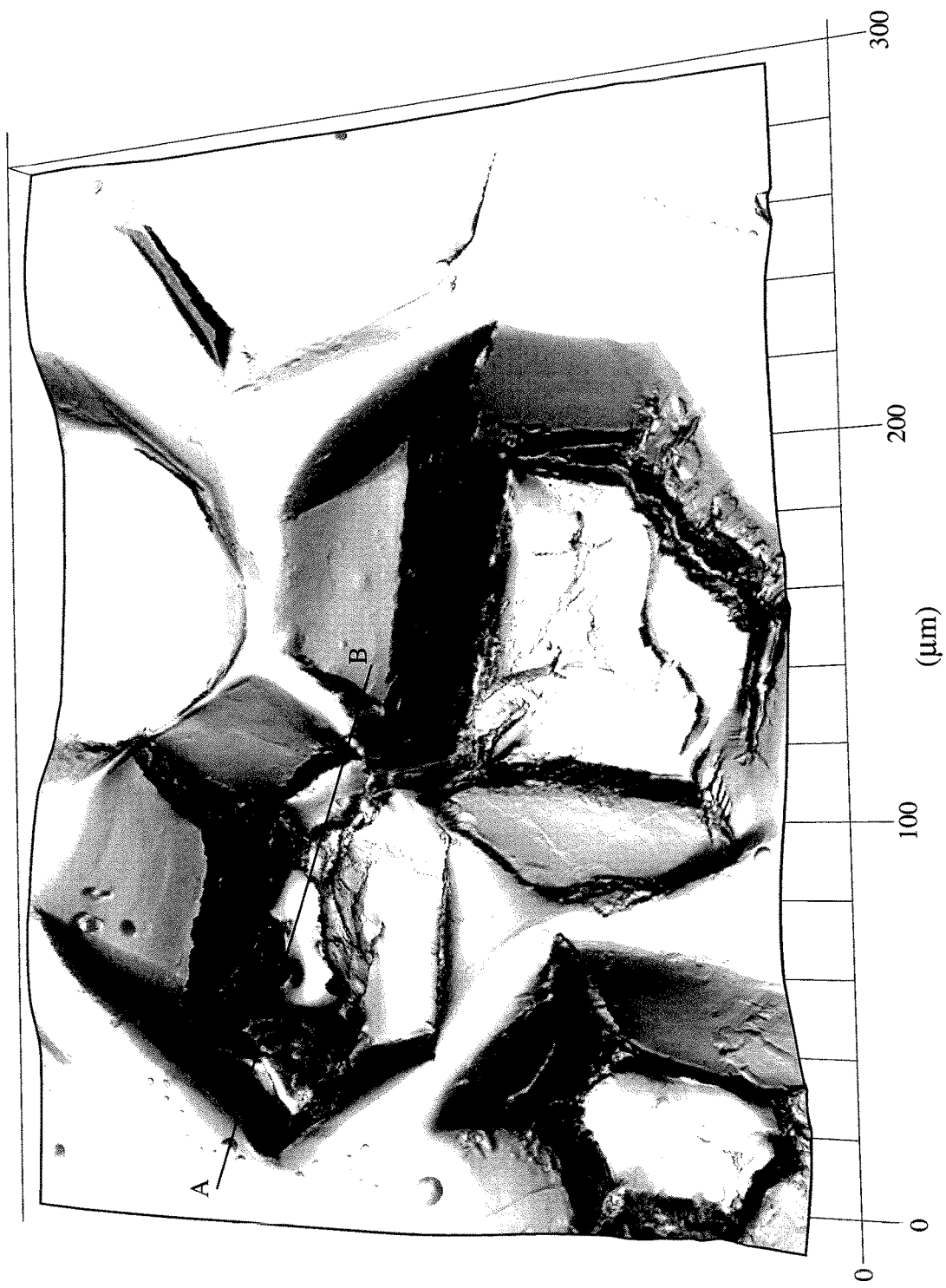
FIG. 11 is a laser photomicrograph (magnification: 1000 times) showing the high-moisture-permeability, microporous OPP film of Sample 3.
Figure 12:
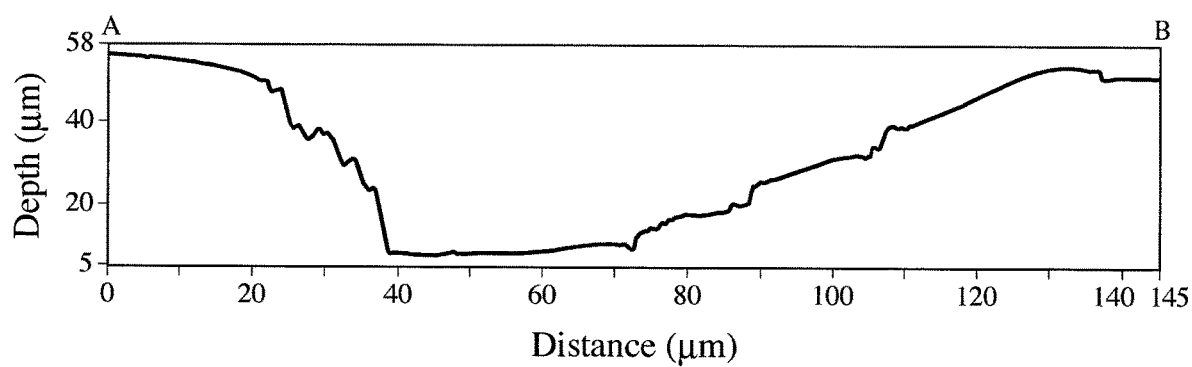
FIG. 12 is a graph showing a profile of the high-moisture-permeability, microporous OPP film along a line AB in FIG. 11.

FIG. 11 is a laser photomicrograph (magnification: 1000 times) of Sample 3, and FIG. 12 shows the profile (height) of the high-moisture-permeability, microporous OPP film 11' along a line AB in FIG. 11. As is clear from FIGS. 11 and 12, the recesses 11a had substantially polygonal shapes, with clefts 11b formed in boundary regions between sides and bottoms. Samples 1 and 2 also had polygonal shapes, with clefts 11b formed in boundary regions between sides and bottoms.

In Samples 1-3, the percentage of recesses 11a having clefts 11b was measured on each photomicrograph, and the moisture permeability was measured according to JIS Z 0208. The results are shown in Table 1.

TABLE 1

| Sample No. | Recesses 11a | | | | | Moisture Permeability[1] |
|---|---|---|---|---|---|---|
| | Opening Diameter (μm) | | Depth (μm) | | Area Ratio (%) | |
| | Distribution | Average | Distribution | Average | | |
| 1 | 80-150 | 120 | 20-60 | 30 | 14 | 200 |
| 2 | 80-150 | 120 | 20-60 | 30 | 16 | 300 |
| 3 | 110-190 | 150 | 40-60 | 40 | 60 | 5000 |

Note:
[1]The unit is g/m$^2$ · 24 hr · 40° C. 90% RH.

Effects of the Invention

Because the high-moisture-permeability, microporous plastic film of the present invention is produced by passing a plastic film under pressure through a gap between a pattern roll randomly having a lot of high-hardness, fine particles having different sizes and an anvil roll having a lot of recesses having different sizes, a lot of recesses having different opening diameters and depths are randomly formed in the plastic film, with clefts contributing to moisture permeability formed in the recesses.

Because the sizes and number of clefts can be adjusted by a pressing force (linear pressure) to the plastic film, the high-moisture-permeability, microporous plastic film of the present invention can be provided with desired moisture permeability. Also, because clefts contributing to moisture permeability are formed by pressing with the pattern roll and the anvil roll, a high-moisture-permeability, microporous plastic film having desired moisture permeability can be produced efficiently.

The high-moisture-permeability, microporous plastic film of the present invention is suitable for packaging films of moisture-vaporizable contents such as bread and vegetables, as well as for other applications (for example, construction materials) requiring gas permeability and moisture permeability.

DESCRIPTION OF REFERENCE NUMERALS

1: Pattern roll
1a: Pattern roll body
1b: High-hardness, fine particles
1c: Plating layer
2: Anvil roll
2a: Recesses of anvil roll
3, 4: First and second reels
5, 6: Backup rolls
7, 8: Guide rolls
11: Plastic film
11': High-moisture-permeability, microporous plastic film
11a: Recesses of high-moisture-permeability, microporous plastic film
11b: Clefts of recesses of high-moisture-permeability, microporous plastic film
21, 22, 25, 26: Bearings
30: Frame of pore-forming apparatus
32, 35, 36: Driving means

What is claimed is:

1. An apparatus for producing a high-moisture-permeability, microporous plastic film randomly having a lot of recesses having different opening diameters and depths, with clefts formed in said recesses, comprises
   a pattern roll randomly having a lot of high-hardness, fine particles having different sizes and sharp edges on a roll body surface;
   an anvil roll arranged oppositely to said pattern roll;
   a conveyor roll for passing a plastic film through a gap between said pattern roll and said anvil roll; and
   a means for adjusting the gap between said pattern roll and said anvil roll;
   said anvil roll being randomly provided with a lot of recesses on the surface.

2. The apparatus for producing a high-moisture-permeability, microporous plastic film according to claim 1, wherein high-hardness, fine particles on said pattern roll have Mohs hardness of 5 or more, an aspect ratio of 2 or less, a diameter distribution in a range of 80-500 μm, and a height distribution in a range of 20-200 μm; and wherein recesses of said anvil roll have an opening diameter distribution in a range of 70-350 μm and a depth distribution in a range of 15-150 μm.

3. The apparatus for producing a high-moisture-permeability, microporous plastic film according to claim 1, wherein high-hardness, fine particles on said pattern roll have an average diameter of 150-400 μm and an average height of 50-150 μm; and wherein recesses formed on a surface of said anvil roll have an average opening diameter of 110-300 μm and an average depth of 25-120 μm.

4. The apparatus for producing a high-moisture-permeability, microporous plastic film according to claim 1, wherein said high-hardness, fine particles are attached at an area ratio of 10-70% to a roll surface of said pattern roll; and wherein the area ratio of said recesses on the surface of said anvil roll is 10-70%.

5. A high-moisture-permeability, microporous plastic film made using the apparatus of claim 1, randomly having a lot of recesses having different opening diameters and depths, with clefts formed in said recesses;
  said recesses having an opening diameter distribution in a range of 60-300 μm and a depth distribution in a range of 10-100 μm; and
  50% or more of said clefts being formed in boundary regions between the bottoms and sides of said recesses, thereby having moisture permeability of 100-700 g/m²·24 hr·40° C.90% RH.

6. The high-moisture-permeability, microporous plastic film according to claim 5, wherein said recesses have an opening diameter distribution as wide as 100 pm or less, a depth distribution as wide as 50 pm or less.

7. The high-moisture-permeability, microporous plastic film according to claim 5, wherein said recesses have substantially polygonal shapes.

8. The high-moisture-permeability, microporous plastic film according to claim 5, wherein said recesses have an area ratio of 10-70% on a surface of said plastic film.

9. The high-moisture-permeability, microporous plastic film according to claim 5, wherein said clefts are preferably formed in at least 30% of said recesses.

* * * * *